United States Patent
Yu (10) Patent No.: US 9,641,612 B2
(45) Date of Patent: May 2, 2017

(54) VIRTUALIZED FUSION STORAGE SYSTEM

(71) Applicants: INVENTEC (PUDONG) TECHNOLOGY CORPORATION, Shanghai (CN); INVENTEC CORPORATION, Taipei (TW)

(72) Inventor: Xiong-Jie Yu, Shanghai (CN)

(73) Assignee: INVENTEC (PUDONG) TECHNOLOGY CORPORATION, Taipei (TW)

( * ) Notice: Subject to any disclaimer, the term of this patent is extended or adjusted under 35 U.S.C. 154(b) by 263 days.

(21) Appl. No.: 14/507,218

(22) Filed: Oct. 6, 2014

(65) Prior Publication Data

US 2016/0028807 A1  Jan. 28, 2016

(30) Foreign Application Priority Data

Jul. 25, 2014  (CN) .......................... 2014 1 0357408

(51) Int. Cl.
*G06F 15/16* (2006.01)
*H04L 29/08* (2006.01)
*G06F 11/14* (2006.01)
*G06F 17/30* (2006.01)

(52) U.S. Cl.
CPC .......... *H04L 67/1095* (2013.01); *G06F 11/14* (2013.01); *G06F 17/30233* (2013.01)

(58) Field of Classification Search
USPC ................ 709/248, 203, 200, 220, 217, 224
See application file for complete search history.

(56) References Cited

U.S. PATENT DOCUMENTS

2009/0271412 A1* 10/2009 Lacapra ............ G06F 17/30206

* cited by examiner

*Primary Examiner* — El Hadji Sall
(74) *Attorney, Agent, or Firm* — Kirton McConkie; Evan R. Witt (57) ABSTRACT

A virtualized fusion storage sub-system comprises a first server node; a second server node; and a common storage pool including a hard disk cluster. The first and the second server nodes simultaneously access the common storage pool. Said sub-system has an operation system installed thereon. A storage space unit is defined in the operation system. The first and the second server nodes access the hard disk cluster through the storage space unit so as to carry out synchronization of the first and the second server nodes, thereby assuring a storage redundancy configuration. The operation system has a file server and a virtual server arranged therein. The virtual server is correspondingly connected to the file server on a basis of stacking of application programs of the operation system so as to carry out rapidly match therebetween.

9 Claims, 10 Drawing Sheets

VIRTUALIZED FUSION STORAGE SYSTEM

TECHNICAL FIELD OF THE INVENTION

The present invention relates to a server framework technology, and more particularly, to a virtualized fusion storage system.

BACKGROUND OF THE INVENTION

Figure 1:
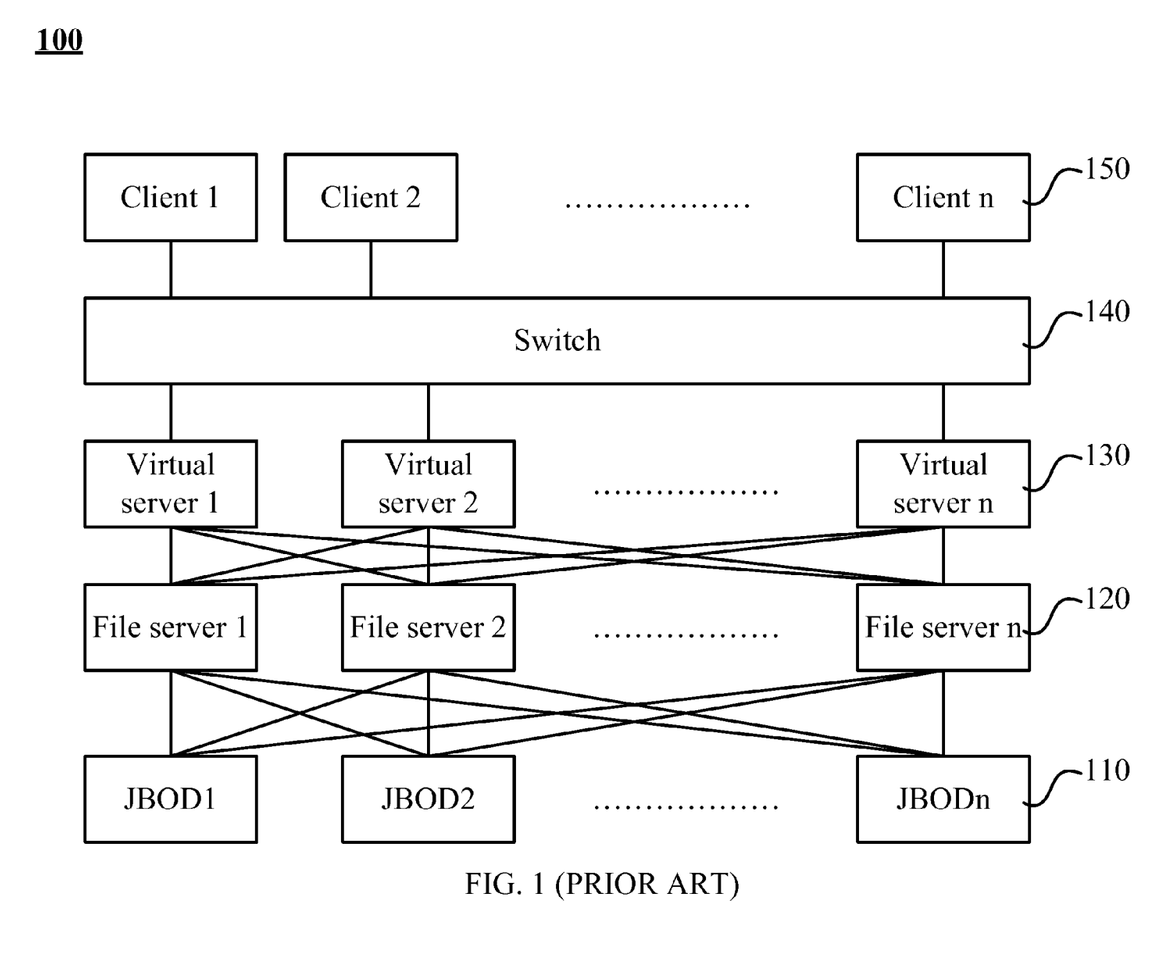
FIG. 1 is a schematic diagram showing a virtualized storage system in convention skills.

Referring to FIG. 1, a traditional virtualized storage system 100 in existing storage solutions for enterprise users is a three-layer cluster framework consisted of a plurality of storage devices 110 which are JBODs (Just a bunch of disks) (or called hard disk clusters), a plurality of file servers 120, and a plurality of virtual servers 130. These layer structures are connected to each other through complicated cables (e.g., SAS cables and optical fibers) and topology of the whole system is accomplished by way of complicated deployment of software layers. As shown in FIG. 1, each storage device 110 (e.g., JBOD1, JBOD2, and JBODn) is connected to the respective file servers 120 (e.g., a file server 1, a file server 2, and a file server n). Each file server 120 is connected to the respective virtual servers 130 (e.g., a virtual server 1, a virtual server 2, and a virtual server n). Each virtual server 130 is connected to a switch 140. The switch 140 is connected to a plurality of clients 150 (e.g., a client 1, a client 2, and a client n). JBOD serves as an important storage device in the storage technical filed and is also called a spanned disk. However, instead of managing data distribution on hard disks at a logic front end, JBODs serving as individual storage resources is used for individual addressing for each hard disk. The file server 120 is a network server having a time-division system file manage function, providing a control of user access records and targets, and taking precautions about security. The virtual server 130 has plural hosts divided therefrom by way of hardware and software technology. The divided hosts have individual function variable names and individual IP addresses but share CPU, RAM, operation system, and application programs of a real host. The server operated by users functions as a real individual host. The users can access data stored in the storage devices 110 through the clients 150, the switch 140, the virtual servers 130 and the file servers 120. Since each storage device 110 is connected to the respective file servers 120, each file server 120 is connected to the respective virtual servers 130, as well as each virtual server 130 is connected to the switch 140, the entire traditional virtualized storage system 100 has a better redundancy design. However, the traditional virtualized storage system 100 has the following drawbacks due to such a redundancy design. Firstly, complicated network cables connected between the virtual servers 130 and the file servers 120 need a topology configured by software as well as complicated network cables connected between the file servers 120 and the storage devices 110. Secondly, complicated cable connections and interface deployments make the expansion become quite trivial and low efficient when the system is to be expanded.

Accordingly, there is a need to provide a novel virtualized fusion storage system for solving above problems.

SUMMARY OF THE INVENTION

An objective of the present invention is to provide a virtualized fusion storage system, which merges a three-layer framework existing in a traditional virtualized storage system into a cluster system, flattens the deployment of entire storage system by way of a virtualization solution, and simplifies the complicated cable deployment in the three-layer framework existing in the traditional virtualized storage system such that it is easy to expand the clusters in the virtualized fusion storage system of the present invention, thereby enhancing reliability and maintainability of the whole system.

To solve above technical problem, the present invention provides a virtualized fusion storage sub-system, at least comprising: a first server node; a second server node; and a common storage pool including at least one hard disk cluster, the first server node and the second server node being allowed to simultaneously access the common storage pool; wherein the virtualized fusion storage sub-system has an operation system installed thereon, a storage space unit is defined in the operation system, the first server node and the second server node access the at least one hard disk cluster in the common storage pool through the storage space unit so as to synchronize the first server node and the second server node for a storage redundancy configuration, the operation system has a file server and a virtual server arranged therein, the virtual server is correspondingly connected to the file server on a basis of stacking of application programs of the operation system so as to match the virtual server and the file server.

In one embodiment of the present invention, the file server is configured with the first server node and the second server node, and the virtual server is configured with the first server node and the second server node.

In one embodiment of the present invention, the simultaneous access of the first server node and the second server node to the common storage pool is carried out by a dual domain storage technology.

In one embodiment of the present invention, multiple first server nodes and multiple second server nodes are included in the virtualized fusion storage sub-system.

In one embodiment of the present invention, the virtualized fusion storage sub-system is mounted on a server machine.

In one embodiment of the present invention, each of the first server node and the second server node comprises at least one controller, and the at least one controller of the first server node and the at least one controller of the second server node are respectively coupled to the at least one hard disk cluster.

In one embodiment of the present invention, the virtualized fusion storage sub-system further comprises at least one storage extension module, each controller being connected to the at least one hard disk cluster by way of the at least one storage extension module.

In one embodiment of the present invention, the at least one controller of the first server node and the at least one controller of the second server node are respectively connected to a same hard disk cluster by way of the at least one storage extension module.

In one embodiment of the present invention, each storage extension module is connected to the at least one controller of the first server node and the at least one controller of the second server node.

Another objective of the present invention is to provide a virtualized fusion storage system, comprising: a plurality of afore-described virtualized fusion storage sub-systems; a switch connected to each one of the virtualized fusion storage sub-systems and to a plurality of clients; and the plural clients for allowing users to access corresponding virtualized fusion storage sub-systems via the plural clients.

The advantage of the present invention is to adopt a high-density, high-bandwidth, and redundancy design to merge the deployments and connections in the existing three-layer framework into a 4 U (1 U=44.45 cm) storage system. Compared to conventional skills, the present invention has the following technical effects: (1) saving more than half of the space; (2) achieving simplified topology design processes and cable connections between layers; (3) reducing signal loss and delay in the existing three-layer framework by way of the integrated flat structure and efficiently improving the system operation efficiency and stability; and (4) very easy to expand by way of virtualization inside the system.

DETAILED DESCRIPTION OF THE INVENTION

A virtualized fusion storage sub-system provided in the present invention is detailedly described with specific embodiments as follows in conjunction with appending drawings.

Figure 2:
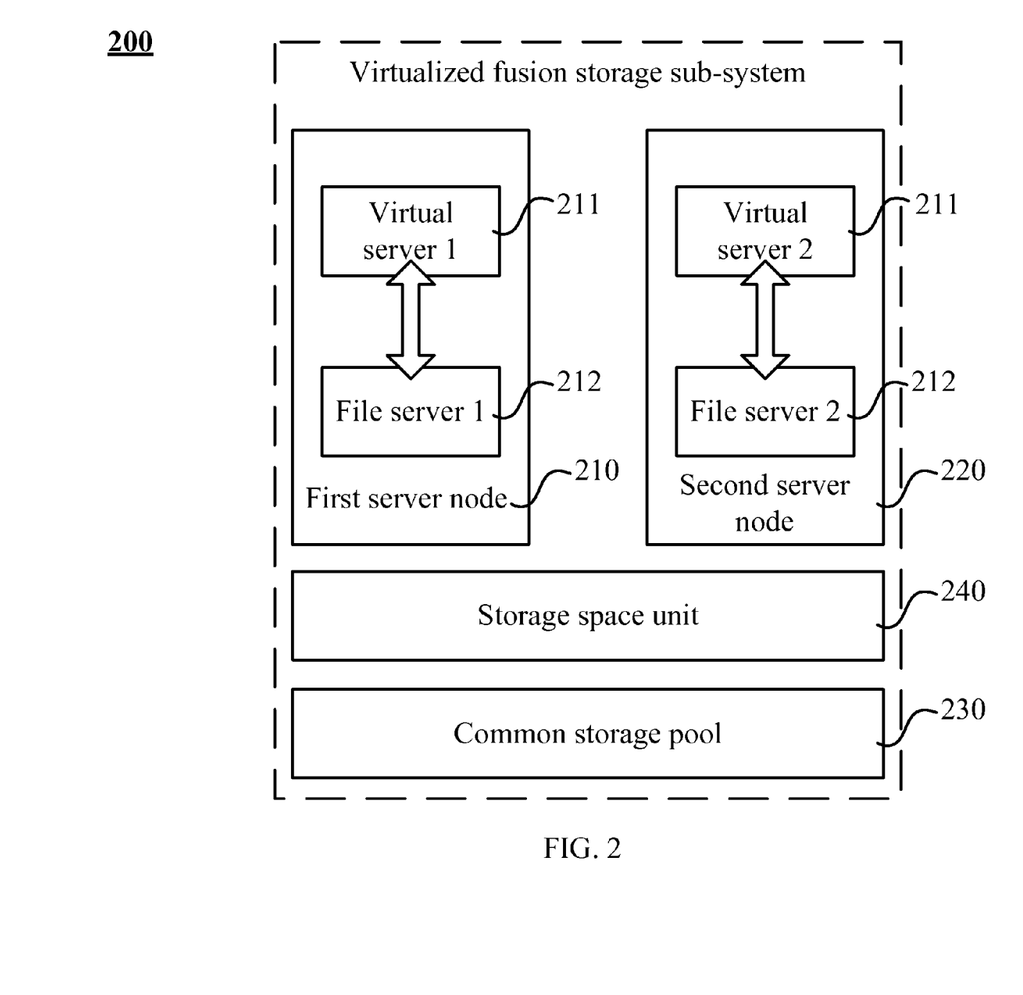
FIG. 2 is a schematic diagram showing a virtualized fusion storage sub-system in accordance with one embodiment of the present invention.

FIG. 2 is a schematic diagram showing a virtualized fusion storage sub-system in accordance with one embodiment of the present invention.

Please refer to FIG. 2. According to an objective of the present invention, the present invention provides a virtualized fusion storage sub-system 200, which is arranged in a server such as a 4 U server cluster. The virtualized fusion storage sub-system 200 at least comprises a first server node 210, a second server node 220, a storage space unit 240, and a common storage pool 230. In other embodiments of the present invention, multiple first server nodes and multiple second server nodes are included in the virtualized fusion storage sub-system 200.

As shown in FIG. 2, the first server node 210 and the second server node 220 form a mutual redundancy storage configuration. That is, any one of the first server node 210 and the second server node 220 can be a backup of the other server node. The situation that the virtualized fusion storage sub-system 200 is not functioning properly due to malfunction of one single server node can be reduced or avoided by way of the aforesaid redundancy configuration. Data serviceability and security play an important role in continuous operations for the storage system particularly used in manufacture, medical service, and retail business. The virtualized fusion storage sub-system 200 has an operation system (not shown) installed thereon. A storage space unit 240 is defined in the operation system. The first server node 210 and the second server node 220 access at least one hard disk cluster 310 in the common storage pool 230 through the storage space unit 240 so as to carry out synchronization of the first server node and the second server node, thereby assuring the mutual redundancy storage configuration. The operation system at least has a virtual server 211 and a file 212 server arranged therein. The file server 212 may be configured with the first server node 210 and the second server node 220, as well as the virtual server 211 may be configured with the first server node 210 and the second server node 220, as shown in FIG. 2. The virtual server 211 (e.g., a virtual server 1 and a virtual server 2 shown in FIG. 2) is correspondingly connected to the file server 212 (e.g., a file server 1 and a file server 2 shown in FIG. 2) on a basis of stacking of application programs of the operation system so as to carry out rapidly match between the virtual server 211 and the file server 212. Compared to server topology configured through network cable connections and associated software in conventional skills, the present invention contributes to the efficiency of the storage system by way of stacking of application programs, with no need to spend too much system operation time, thereby solving the problem of delay and complicated match between the virtual server 211 and the file server 212. By way of a virtual layer (not shown), a plurality of host systems (not shown) arranged in the virtual server 211 can carry out cooperation, centralized management, and uninterrupted maintenance. The plural host systems may be operated on the same operation system or different operation systems. The virtual layer servers as an abstract layer that couples physical hardware to an operation system associated with application programs, so as to carry out an improvement of resource utilization and flexibility. The virtual layer allows clients or virtual machines having homogeneous or heterogeneous operation systems to operate on the same or different physical machines in an individual and concurrent manner. Since the server nodes 210, 220 configured by the virtual server 211 and the file server 212 belong to a flat framework of the same layer, it is able to simplify the management to cables (e.g., SAS cables and optical fibers) between the existing virtual servers and file servers. That is, only a simple configuration is needed to carry out the access of multiple different host systems to the file server 212, with no need to physically connect to the file server 212. In addition, the flat framework provides a powerful extending ability. Accordingly, it is easy to carry out adding (or called expansion) virtual servers or file servers to the virtualized fusion storage sub-system 200, thereby dramatically enhancing reliability and maintainability of the whole system.

Figure 3A:
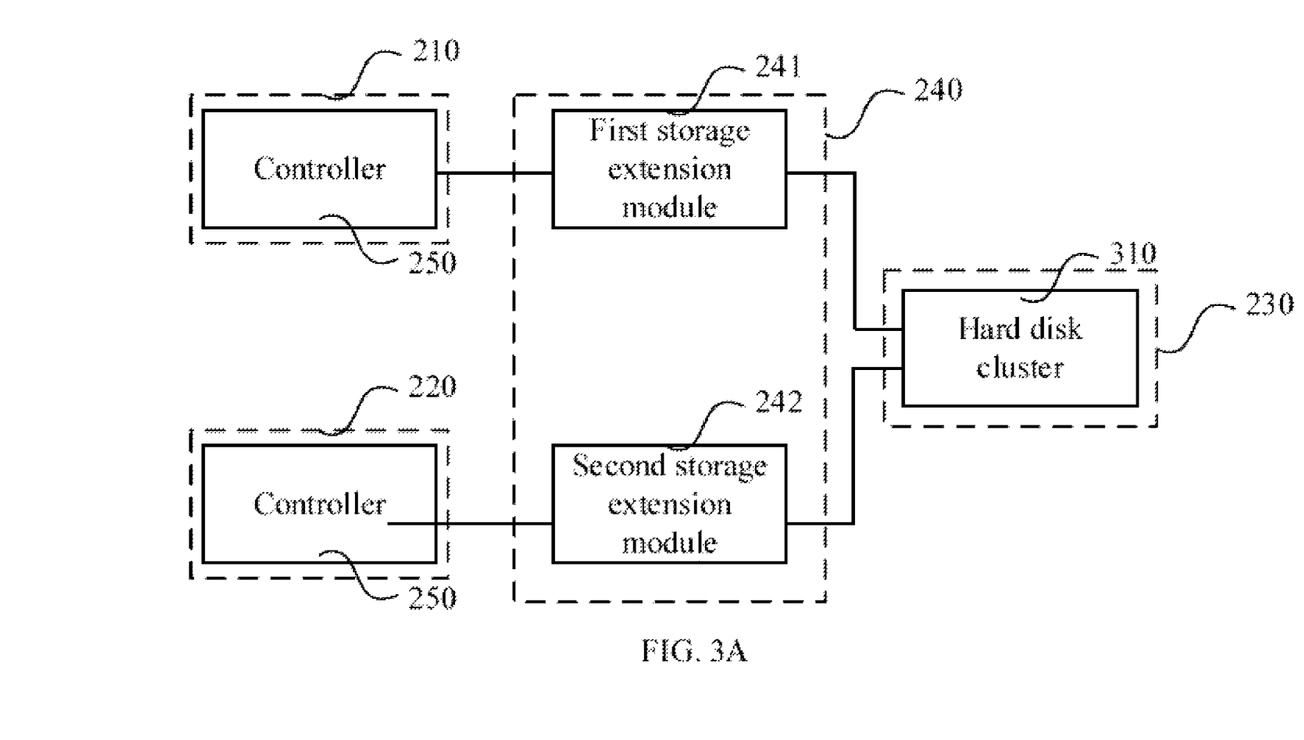
FIG. 3A is a schematic diagram showing a part of the virtualized fusion storage sub-system shown in FIG. 2, in which dual domain SAS controllers are connected to a hard disk cluster through storage extension modules of a storage space unit.
Figure 3B:
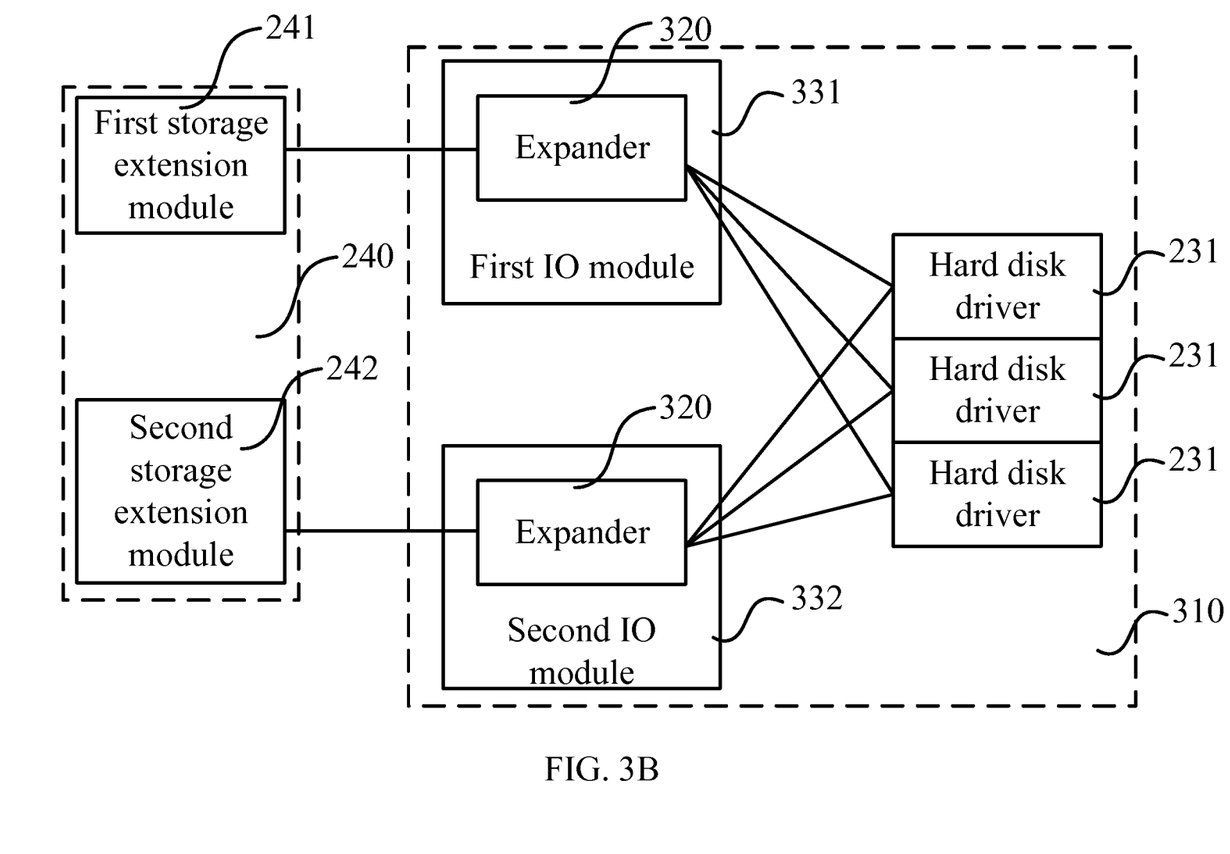
FIG. 3B is a schematic diagram showing a framework including the hard disk cluster shown in 3A.
Figure 3C:
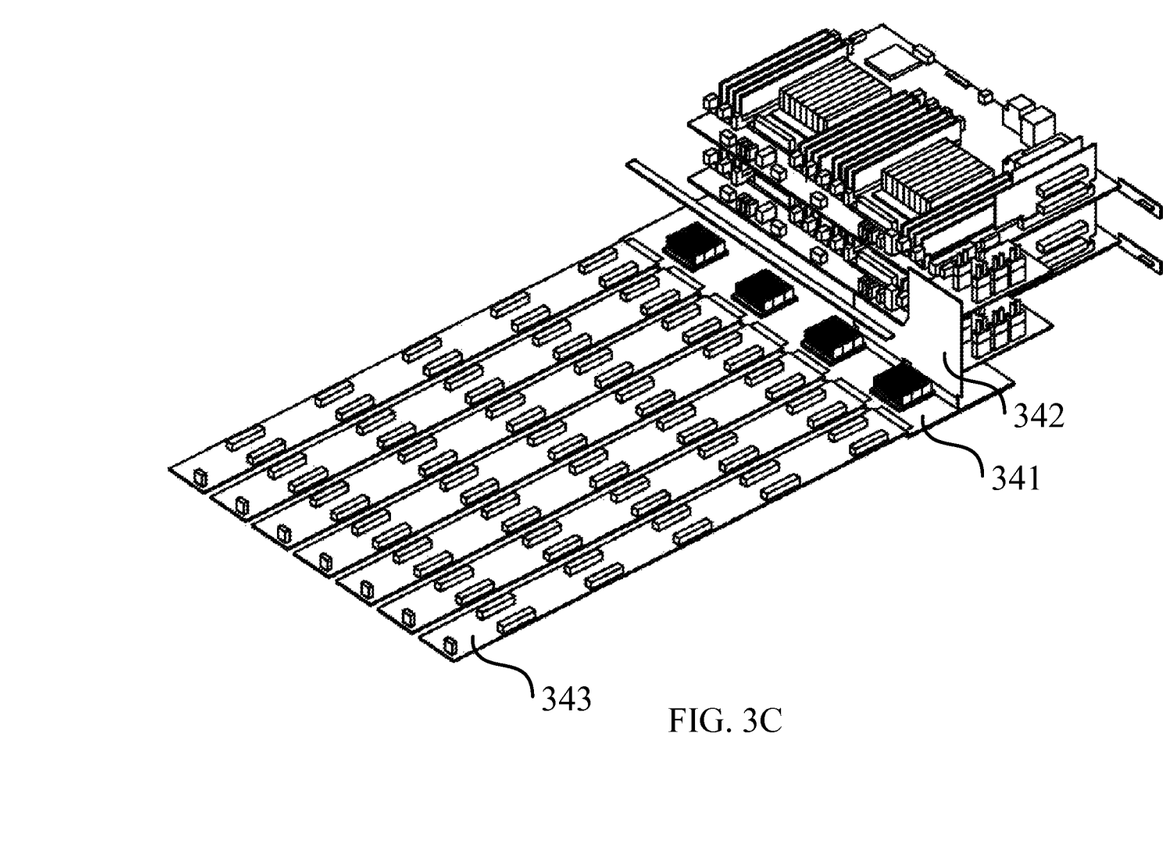
FIG. 3C is a schematic diagram showing inner parts of a 4 U server cluster in accordance with one embodiment of the present invention.

FIG. 3A is a schematic diagram showing a part of the virtualized fusion storage sub-system shown in FIG. 2. Amongst, dual domain SAS controllers are connected to the hard disk cluster through storage extension modules of the storage space unit. FIG. 3B is a schematic diagram showing a framework including the hard disk cluster shown in 3A. FIG. 3C is a schematic diagram showing inner parts of a 4 U server cluster in accordance with one embodiment of the present invention.

As shown in FIG. 2 and FIG. 3A, each of the first server node 210 and the second server node 220 comprises at least one controller 250. The control 250 is utilized to process data signals and control signals, and control input and output. Each controller 250 is connected to at least one hard disk cluster 310 of the common storage pool 230 through the storage space unit 240.

As shown in FIG. 3A, the common storage pool 230 includes at least one hard disk cluster 310. Referring further to FIG. 3A and FIG. 3B, each hard disk cluster 310 includes a plurality of hard disk drivers 231. The hard disk drivers 231 are provided for the first server node 210 and the second server node 220 to share stored data. The hard disk drivers 231 can be dual domain SAS drivers or SATA drivers but are not limited thereto.

As shown in FIG. 2, the first server node 210 and the second server node 220 access the common storage pool 230 through the storage space unit 240 so as to carry out synchronization of the first server node 210 and the second server node 220, thereby assuring the mutual redundancy storage configuration. As shown in FIG. 3A, the storage space unit 240 includes a first storage extension module 241 and a second storage extension module 242. The first storage extension module 241 and the second storage extension module 242 are same storage extension modules such that the at least one controller 250 of the first server node 210 and the at least one controller 250 of the second server node 220 are connected to a same hard disk cluster 310 in the common storage pool 230 respectively through the first storage extension module 241 and the second storage extension module 242 of the storage space unit 240. The first storage extension module 241 and the second storage extension module 242 are utilized to transmit commands and data outputted by the controllers 250 to the hard disk drivers 231 (e.g., SAS drivers and SATA drivers) of a hard disk cluster 310.

Referring further to FIG. 3A and FIG. 3B, the hard disk cluster 310 of the common storage pool 230 further includes a first IO module 331 and a second IO module 332. Each of the first IO module 331 and the second IO module 332 includes an expanders 320. Each expander 320 is connected to the plural hard disk drivers 231. Meanwhile, one of two expanders 320 is connected to the controller 250 of the first server node 210 through the first storage extension module 241 corresponding thereto, and the other one is connected to the controller 250 of the second server node 220 through the second storage extension module 242 corresponding thereto. The expander 320 may adopt three types of routing approaches, i.e., direct routing, routing table, and subtractive routing, so as to carry out routing between the controller 250, the storage extension module, the expander 320, and the hard disk drivers 231. The expanders 320 are optional components. In other embodiments of the present invention, the first storage extension module 241 and the second storage extension module 242 can directly connect to the hard disk drivers 231.

In the embodiments of the present invention, the at least one controller 250 of the first server node 210 and the at least one controller 250 of the second server node 220 shown in FIG. 3A and FIG. 3B can carry out simultaneous access to a same hard disk drive 231 by way of a dual domain SAS (Serial Attached SCSI) technology, and the first storage extension module 241 and the second storage extension module 242 of the storage space unit 240. In other embodiments, the controllers 250 can be substituted with HBAs (host bus adapters), which is also able to carry out the simultaneous access to a same hard disk driver 231 by way of the dual domain SAS technology. Since the virtualized fusion storage sub-system 220 carries out the mutual redundancy storage configuration by way of the dual domain SAS technology, it can tolerate malfunction of the host but adapters, the expanders, the hard disk cluster (JBOD), and external cables. This is extremely important. The dual domain SAS technology is different from a dual path SATA technical scheme existing in conventional skills. The later adopts a single domain to endure malfunction of cables but the former provides entire dual domain SAS for redundancy. In addition, compared to the dual path SATA scheme, the dual domain SAS technology can provide high reliability, performance, and data serviceability. Noted that the main difference between the dual domain SAS technology and the dual path SATA scheme is use of a SAS driver or a SATA driver. Since a dual-port hard disk driver can provide a redundancy configuration for entire paths in a dual domain SAS and the SAS driver is a type of dual-port hard disk drivers, the dual domain SAS technology should adopt the SAS driver. In the embodiments of the present invention, the hard disk drivers 231 are SAS drivers, each of which has dual ports and meets the afore-mentioned requirements.

The dual domain SAS meets the requirement of redundancy design when the hard disk drivers 231 are dual-port hard disk drivers, and the first IO module 331 and the second IO module 332 form a mutual redundancy configuration. Accordingly, the dual domain SAS disclosed in the present embodiment can tolerate malfunction of one port of the dual-port hard disk driver, malfunction of any one of the first IO module 331 and the second IO module 332, malfunction of one of two ports of the controller 250 compatible with the dual domain SAS, or malfunction of external cables, without affecting entire operations of the virtualized fusion storage sub-system 220.

In addition, the at least one controller 250 of the first server node 210 and the at least one controller 250 of the second server node 220 shown in FIG. 3A and FIG. 3B can connect to the hard disk drivers 231 pertaining to SAS drivers by way of a SSP protocol through the storage extension modules (i.e., the first storage extension module 241 and the second storage extension module 242) and the expanders 320. Of course, the controller 250 can also connect to the hard disk drivers 231 pertaining to SAS drivers by way of the SSP protocol through storage extension modules and the expanders 320. In the embodiments of the present invention, the controller 250 is connected to the hard disk drivers 231 pertaining to SAS drivers by way of the SSP protocol through the storage extension module and the expander 320.

Please refer to FIG. 3A and FIG. 3C. Each controller 250 may be disposed on a first interface panel 341 (see a reference number 341 in FIG. 3C). For example, the first interface panel 341 is an interposer board for processing data signals and control signals, and controlling output and input. The first storage extension module 241 and the second storage extension module 242 of the storage space unit 240 may be disposed on a second interface panel 342 (see a reference number 342 in FIG. 3C). The second interface panel 342 (also called a MID plane) connects to the first interface panel 341 and a hard disk back plate 343, and is utilized for transferring the data signals and the control signals.

Figure 4A:
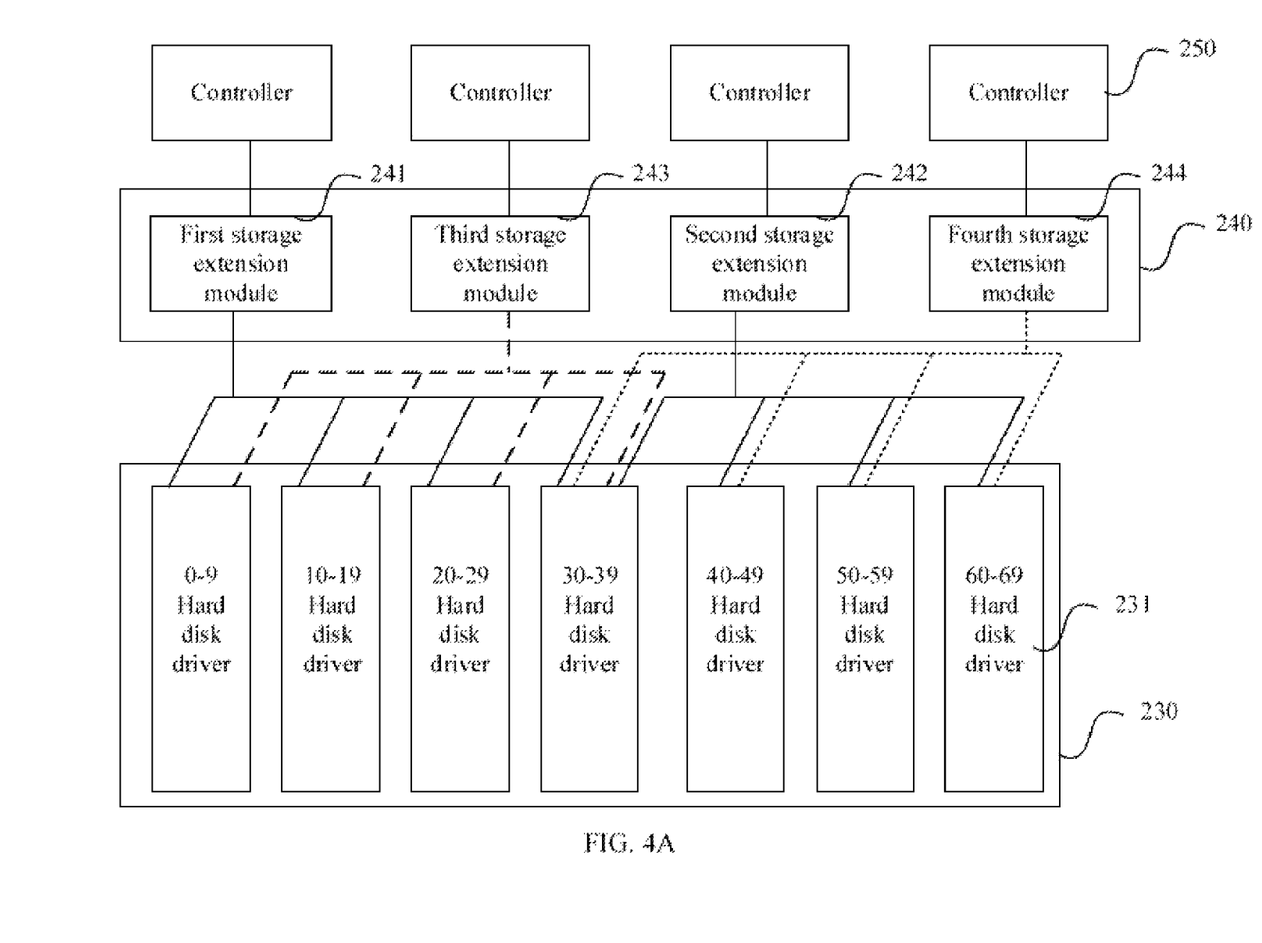
FIG. 4A is a schematic diagram showing connections between plural controllers and seventy hard disk drivers through plural storage extension modules in accordance with one embodiment of the present invention.

FIG. 4A is a schematic diagram showing connections between plural controllers and seventy hard disk drivers through plural storage extension modules in accordance with one embodiment of the present invention. As shown in FIG. 4A, the virtualized fusion storage sub-system includes four controllers 250, each of which has eight ports. Each controller 2250 is directly connected to one corresponding storage extension module in the storage space unit 240. The storage extension module is connected to a plurality of hard disk drivers 231 of one corresponding hard disk cluster 310 in the common storage pool 230. As shown in FIG. 4A, a first storage extension module 241 is connected to a first set of hard disk drivers 231 (the $0^{th}$ to $9^{th}$ hard disk drivers), a second set of hard disk drivers 231 (the $10^{th}$ to $19^{th}$ hard disk drivers), a third set of hard disk drivers 231 (the $20^{th}$ to $29^{th}$ hard disk drivers), and a fourth set of hard disk drivers 231 (the $30^{th}$ to $39^{th}$ hard disk drivers). A third storage extension module 243 is connected to the first set of hard disk drivers 231 (the $0^{th}$ to $9^{th}$ hard disk drivers), the second set of hard disk drivers 231 (the $10^{th}$ to $19^{th}$ hard disk drivers), the third set of hard disk drivers 231 (the $20^{th}$ to $29^{th}$ hard disk drivers), and the fourth set of hard disk drivers 231 (the $30^{th}$ to $39^{th}$ hard disk drivers). A second storage extension module 242 is connected to the fourth set of hard disk drivers 231 (the $30^{th}$ to $39^{th}$ hard disk drivers), a fifth set of hard disk drivers 231 (the $40^{th}$ to $49^{th}$ hard disk drivers), a sixth set of hard disk drivers 231 (the $50^{th}$ to $59^{th}$ hard disk drivers), and a seventh set of hard disk drivers 231 (the $60^{th}$ to $69^{th}$ hard disk drivers). A fourth storage extension module 244 is connected to the fourth set of hard disk drivers 231 (the $30^{th}$ to $39^{th}$ hard disk drivers), the fifth set of hard disk drivers 231 (the $40^{th}$ to $49^{th}$ hard disk drivers), the sixth set of hard disk drivers 231 (the $50^{th}$ to $59^{th}$ hard disk drivers), and the seventh set of hard disk drivers 231 (the $60^{th}$ to $69^{th}$ hard disk drivers).

Figure 4B:
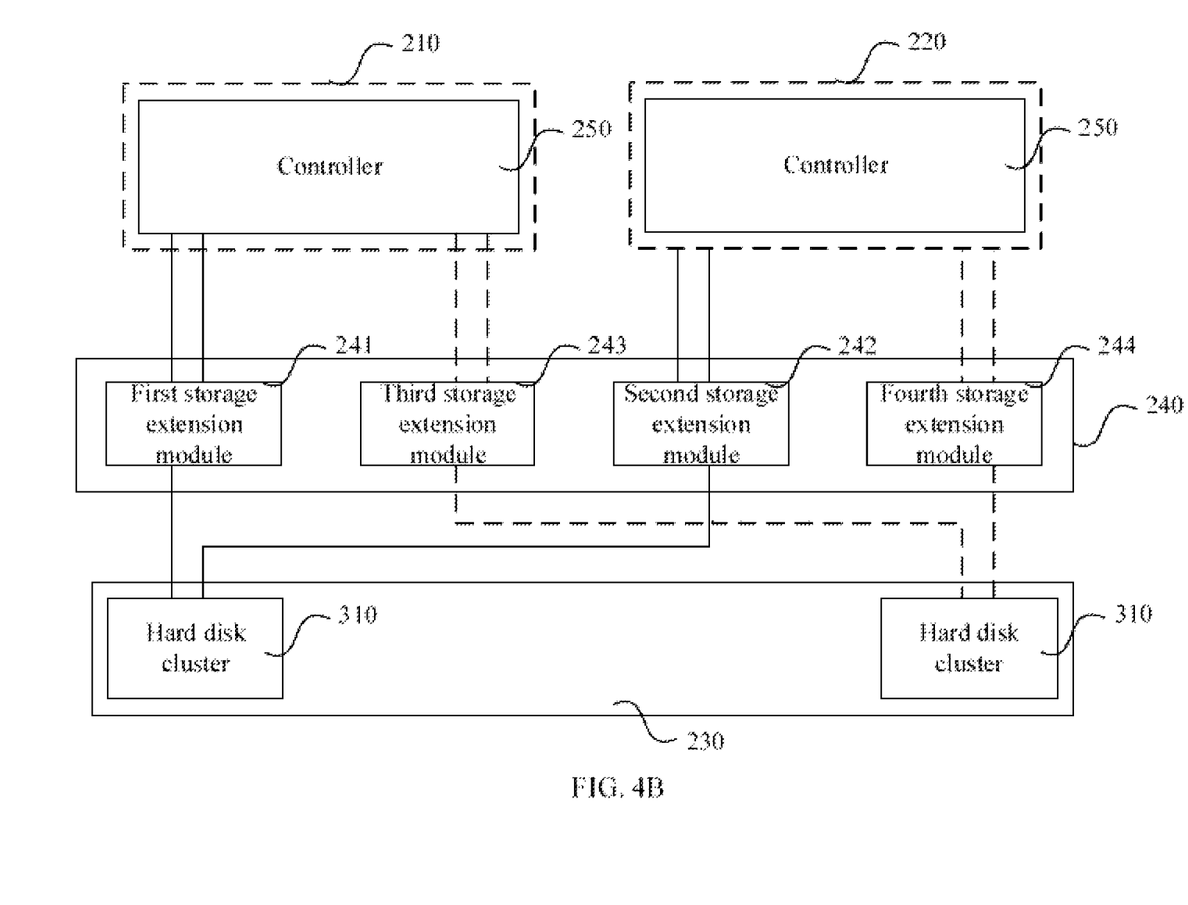
FIG. 4B is a schematic diagram showing connections between two server nodes and plural storage extension modules in accordance with one embodiment of the present invention.

FIG. 4B is a schematic diagram showing connections between two server nodes and plural storage extension modules in accordance with one embodiment of the present invention. As shown in FIG. 4B, one controller 250 of the first server node 210 and one controller 250 of the second server node 220 are connected to a same hard disk cluster 310 in the common storage pool 230 respectively by way of two storage extension modules in the storage space unit 240. Noted that in other embodiments, the number of controllers 250 of the first server node 210 and the number of controllers 250 of the second server node 220 may be plural and are not limited to a single one. The first server node 210 is directly connected to the first storage extension module 241 and the third storage extension module 243 via the controller 250. The second server node 220 is directly connected to the second storage extension module 242 and the forth storage extension module 244 via the controller 250. The first storage extension module 241 and the second storage extension module 242 are commonly connected to a same hard disk cluster 310, as well as the third storage extension module 243 and the fourth storage extension module 244 are commonly connected to another same hard disk cluster 310. As known from above arrangement, the first storage extension module 241 and the second storage extension module 242 form a mutual redundancy configuration, as well as the third storage extension module 243 and the fourth storage extension module 244 form a mutual redundancy configuration. Accordingly, the first server node 210 and the second server node 220 adopting the afore-described redundancy configuration can reduce or avoid the situation that the virtualized fusion storage sub-system 200 is not functioning properly due to a malfunction of one single server node. In addition, as known for above contents, the first server node 210 and the second server node 220 adopting a dual domain storage technology can carry out simultaneous access to plural hard disk drivers 231 of a same hard disk cluster 310. That is, respectively by way of the first storage extension module 241 and the second storage extension module 242, the first server node 210 and the second server node 220 can carry out the simultaneous access to plural hard disk drivers 231 of a same hard disk cluster 310. Similarly, respectively by way of the third storage extension module 243 and the fourth storage extension module 244, the first server node 210 and the second server node 220 can also carry out the simultaneous access to plural hard disk drivers 231 of a same hard disk cluster 310.

Figure 4C:
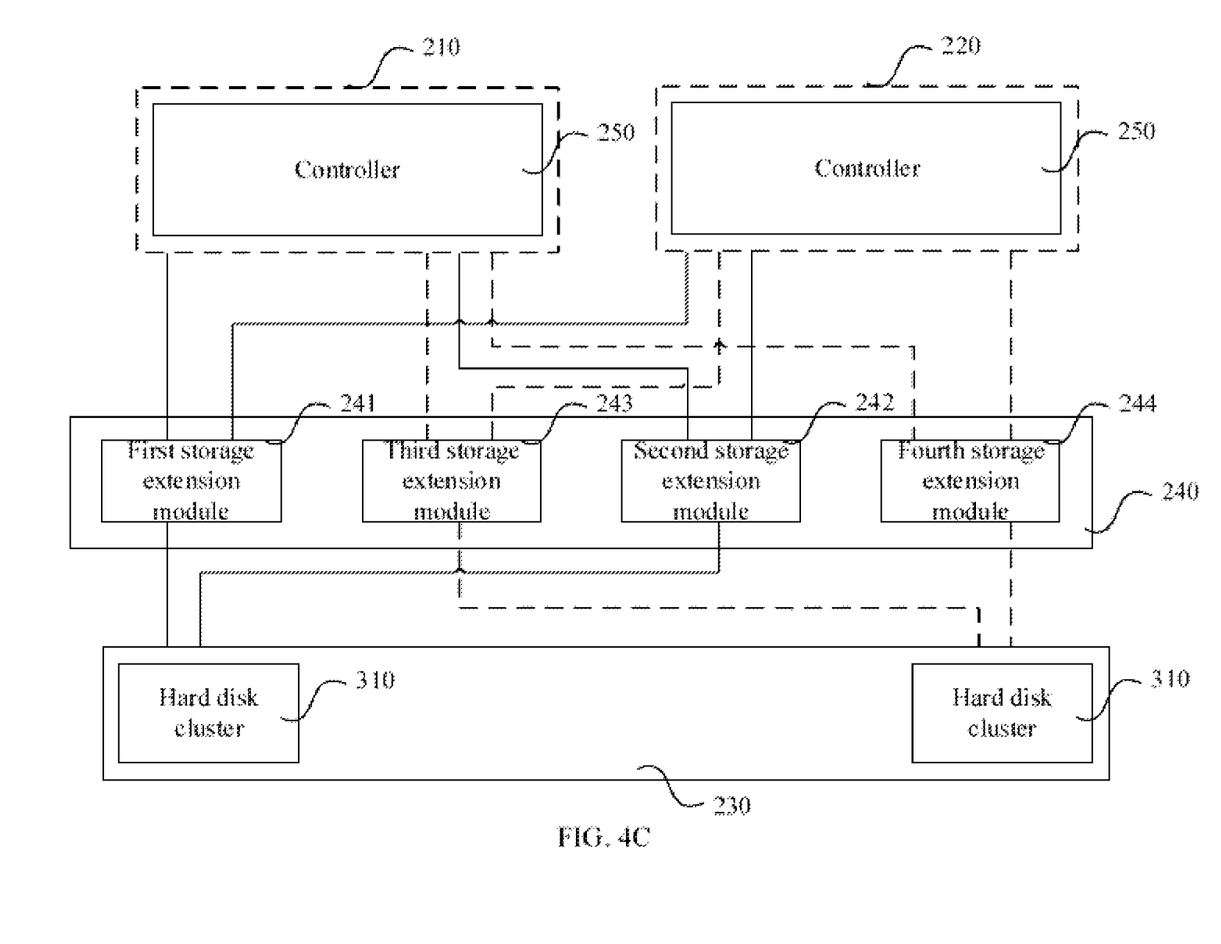
FIG. 4C is a schematic diagram showing connections between two server nodes and plural storage extension modules in accordance with one embodiment of the present invention.

FIG. 4C is a schematic diagram showing connections between two server nodes and plural storage extension modules in accordance with one embodiment of the present invention. As shown in FIG. 4C, in the present embodiment, each storage extension module 241 is connected to at least one controller 250 of the first server node 210 and at least one controller 250 of the second server node 210. The first server node 210 and the second server node 220 are respectively connected to plural storage extension modules through the controllers 250 such that hard disk drivers of plural hard disk clusters 310 in the common storage pool 230 can be connected to corresponding controllers 250 in the first sever node 210 and the second server node 220, thereby establishing a SAS domain on a large scale. In the present embodiment, the first server node 210 includes one controller 250 as well as the second server node 220 includes one controller 250. Each of the controller 250 of the first server node 210 and the controller 250 of the second sever node 220 has eight HD SAS ports. The controller 250 of the first server node 210 is connected to the first storage extension module 241 and the second storage extension module 242 disposed on the second interface plane 342 (indicated by two solid lines) for serving as a redundancy configuration. The controller 250 of the first server node 210 is connected to the third storage extension module 243 and the fourth storage extension module 244 disposed on the second interface plane 342 (indicated by two dash lines) for serving as a redundancy configuration. Similarly, the controller 250 of the second server node 220 is connected to the third storage extension module 243 and the fourth storage extension module 244 disposed on the second interface plane 342 (indicated by two dash lines). The controller 250 of the second server node 220 is connected to the first storage extension module 241 and the second storage extension module 242 disposed on the second interface plane 342 (indicated by two solid lines). As known from above arrangement, the first storage extension module 241 and the second storage extension module 242 are mutual redundant, as well as the third storage extension module 243 and the fourth storage extension module 244 are mutual redundant. Accordingly, the situation that the virtualized fusion storage sub-system is not functioning properly due to a malfunction of one single server node 250 can be reduced or avoided.

Figure 4D:
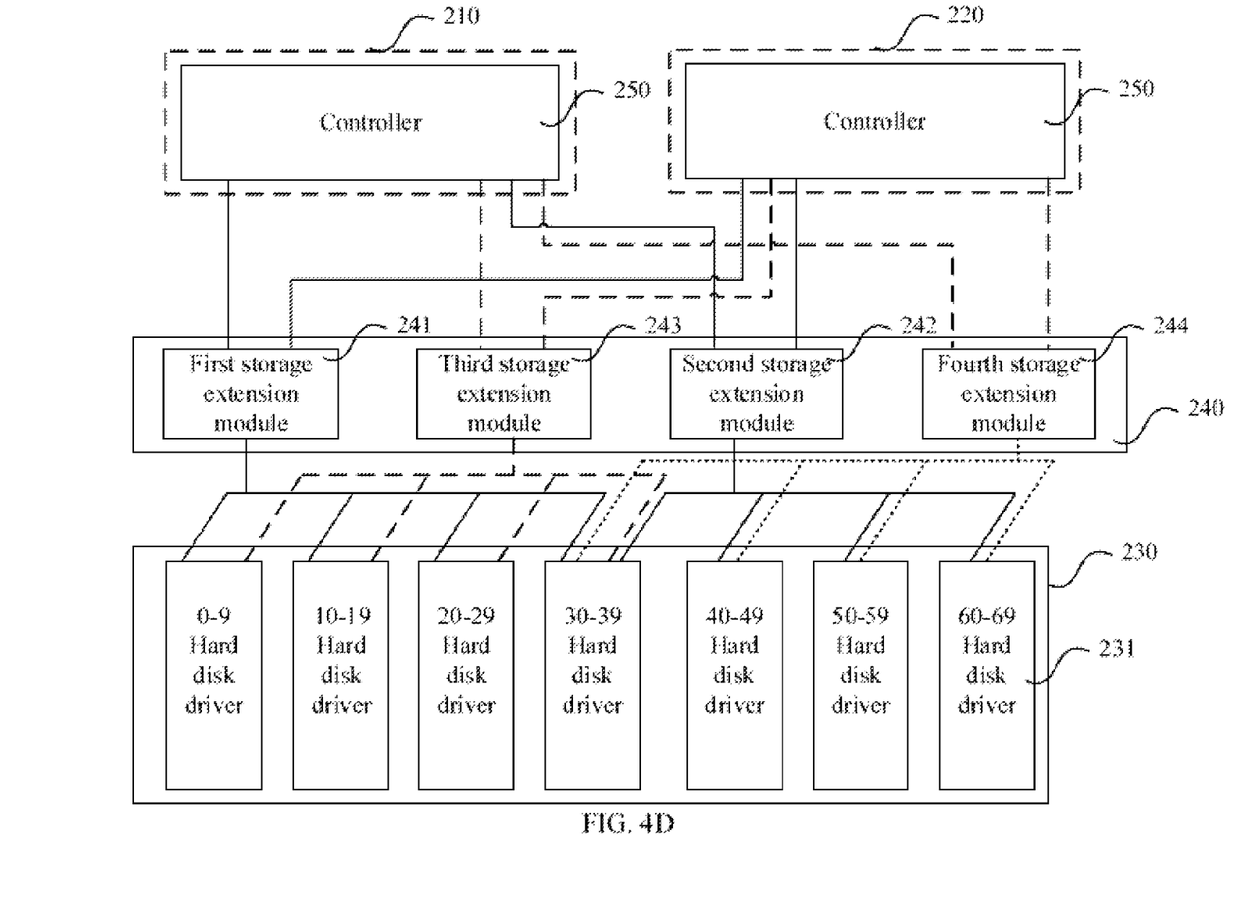
FIG. 4D is a schematic diagram showing another type of connections between two controllers and seventy hard disk drivers through plural storage extension modules in accordance with one embodiment of the present invention.

FIG. 4D is a schematic diagram showing another type of connections between two controllers and seventy hard disk drivers through plural storage extension modules in accordance with one embodiment of the present invention. As shown in FIG. 4D, the first server node 210 and the second server node 220 in the virtualized fusion storage sub-system 220 are respectively connected to the first storage extension module 241, the second storage extension module 242, the third storage extension module 243, and the fourth storage extension module 244 on the second interface plane 342 (see a reference number 342 in FIG. 3) through the controllers 250, respectively. The first server node 210 is connected to the first storage extension module 241, the second storage extension module 242, the third storage extension module 243, and the fourth storage extension module 244 on the second interface plane 342, and its connection pattern is the same as that shown in FIG. 4C. Similarly, the second server node 220 is also connected to the first storage extension module 241, the second storage extension module 242, the third storage extension module 243, and the fourth storage extension module 244 on the second interface plane 342, and its connection pattern is the same as that shown in FIG. 4C. Then, the first storage extension module 241, the second storage extension module 242, the third storage extension module 243, and the fourth storage extension module 244 are respectively connected to hard disk drivers 231 of plural hard disk clusters in the common storage pool 230. For example, as shown in FIG. 4D, the first storage extension module 241 is connected to the first set of hard disk drivers 231 (the $0^{th}$ to $9^{th}$ hard disk drivers), the second set of hard disk drivers 231 (the $10^{th}$ to $19^{th}$ hard disk drivers), the third set of hard disk drivers 231 (the $20^{th}$ to $29^{th}$ hard disk drivers), and the fourth set of hard disk drivers 231 (the $30^{th}$ to $39^{th}$ hard disk drivers). The third storage extension module 243 is connected to the first set of hard disk drivers 231 (the $0^{th}$ to $9^{th}$ hard disk drivers), the second set of hard disk drivers 231 (the $10^{th}$ to $19^{th}$ hard disk drivers), the third set of hard disk drivers 231 (the $20^{th}$ to $29^{th}$ hard disk drivers), and the fourth set of hard disk drivers 231 (the $30^{th}$ to $39^{th}$ hard disk drivers). The second storage extension module 242 is connected to the fourth set of hard disk drivers 231 (the $30^{th}$ to $39^{th}$ hard disk drivers), the fifth set of hard disk drivers 231 (the $40^{th}$ to $49^{th}$ hard disk drivers), the sixth set of hard disk drivers 231 (the $50^{th}$ to $59^{th}$ hard disk drivers), and the seventh set of hard disk drivers 231 (the $60^{th}$ to $69^{th}$ hard disk drivers). The fourth storage extension module 244 is connected to the fourth set of hard disk drivers 231 (the $30^{th}$ to $39^{th}$ hard disk drivers), the fifth set of hard disk drivers 231 (the $40^{th}$ to $49^{th}$ hard disk drivers), the sixth set of hard disk drivers 231 (the $50^{th}$ to $59^{th}$ hard disk drivers), and the seventh set of hard disk drivers 231 (the $60^{th}$ to $69^{th}$ hard disk drivers). In conjunction with FIG. 4C, a first controller 250 and a second controller 250 in the first server node 210 and the second server node 220 form a complementary arrangement. Also, a cluster interconnect is formed between the first controller 250 and the second controller 250. Accordingly, redundancy can be provided during a malfunction of the controller 250 or cables.

In the embodiments of the present invention, the number of hard disk drivers 231 in the common storage pool 230 is seventy. Since the virtualized fusion storage sub-system 200 of the present invention adopts a dual domain SAS technology, it can carry out the simultaneous access of the first server node 210 and the second server node 220 to the entire seventy hard disk drivers 231. The first server node 210 and the second server node 220 simultaneously access seventy hard disk drivers 231 (all of which are SAS drivers, herein) in the common storage pool 230 by way of the dual domain storage technology through the storage extension modules of the storage space unit 240. Accordingly, the synchronization of the first server node 210 and the second server node 220 is carried out, thereby assuring redundancy storage configuration and symmetric paths. Therefore, the virtualized fusion storage sub-system 200 serving as an enterprise system can ensure data serviceability and security.

Figure 5:
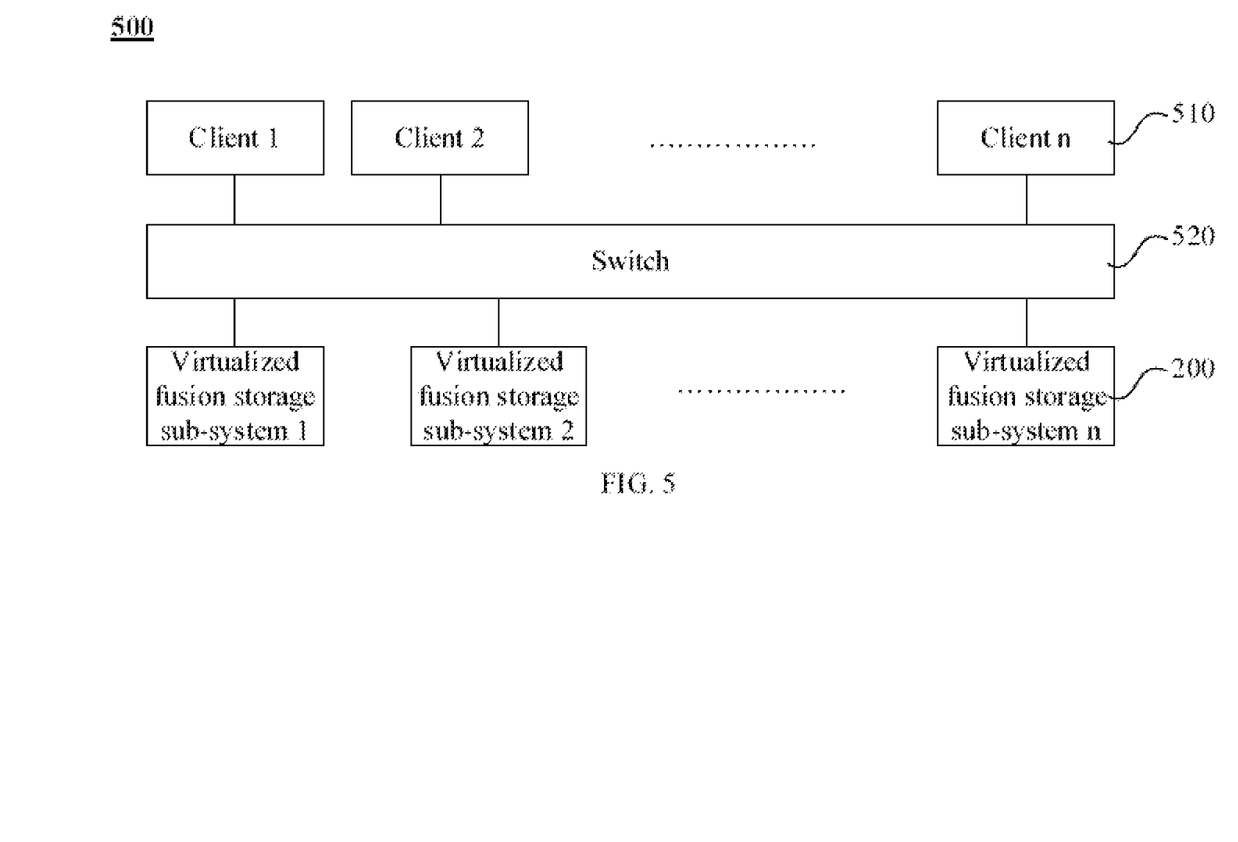
FIG. 5 is a schematic diagram showing a virtualized fusion storage system in accordance with one embodiment of the present invention.

Please refer to FIG. 5. According to another objective of the present invention, the present invention further provides a virtualized fusion storage system 500, which comprises a plurality of afore-described virtualized fusion storage sub-systems 200; a switch 520 connected to each one of the virtualized fusion storage sub-systems 200 and to a plurality of clients 510; and the plural clients 510 for allowing users to access corresponding virtualized fusion storage sub-systems 200 via the plural clients.

Each virtualized fusion storage sub-system 200 combines the virtual server 211, the file server 212, and the storage device such as hard disk drivers pertaining to SAS drivers. Also, an integration of all connections and deployments is proceeded during design. Accordingly, a total solution is able to be provided for users. More importantly, the present invention merges the three-layer framework existing in convention skills into a virtualized fusion storage sub-system 200 of a single-layer framework. Also, virtualization is adopted such that the deployment of entire virtualized fusion storage system 500 is flattened. The complicated cable deployment in the traditional three-layer framework is therefore simplified.

By way of cooperation of the plural virtualized fusion storage sub-system 200, the plural clients 510 (e.g., PC clients), and the switch 520, the users can rapidly access desired data in the hard disk drivers 231 of the virtualized fusion storage sub-system 200 through the clients 510. In addition, as known from above contents, it is easy to expand the clusters in the entire virtualized fusion storage system 500 by way of the stacking technique of the file server 212 and the virtual server 211, and the dual domain SAS storage technology. Therefore, the reliability and maintainability of the entire virtualized fusion storage system 500 are greatly enhanced.

As known form above contents, compared to the storage system existing in conventional skills, the virtualized fusion storage system 500 of the present invention adopts a high-density, high-bandwidth, and redundancy design to merge the deployments and connections in the existing three-layer framework into a 4 U (1 U=44.45 cm) storage system. By flattening the existing three-layer framework, the present invention can carry out a single-layer framework with a high density. Also, the plural storage extension modules of the storage space unit 240 are merged into an interface of a same common storage pool 230. Such an efficient application carries out high bandwidth. That is, the present invention merges the three-layer framework existing in conventional skills into a single-layer framework, thereby saving more than half of the space, and achieving simplified topology design processes and cable connections between layers. Meanwhile, the integrated flat structure can reduce signal loss and delay in the existing three-layer framework and efficiently improve the system operation efficiency and stability. Moreover, cluster expansion and growth is easy to be attained by way of virtualization inside the system, thereby enhancing reliability and maintainability of the whole system.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A virtualized fusion storage sub-system, at least comprising:
a first server node;
a second server node; and
a common storage pool including at least one hard disk cluster, the first server node and the second server node being allowed to simultaneously access the common storage pool;
wherein the virtualized fusion storage sub-system has an operation system installed thereon, a storage space unit is defined in the operation system, the first server node and the second server node access the at least one hard disk cluster in the common storage pool through the storage space unit so as to synchronize the first server node and the second server node for a storage redundancy configuration, the operation system has a file server and a virtual server arranged therein, the virtual server is correspondingly connected to the file server on a basis of stacking of application programs of the operation system so as to match the virtual server and the file server,
wherein each of the first server node and the second server node comprises at least one controller, and the at least one controller of the first server node and the at least one controller of the second server node are respectively coupled to the at least one hard disk cluster.

2. The virtualized fusion storage sub-system according to claim 1, wherein the file server is configured with the first server node and the second server node, and the virtual server is configured with the first server node and the second server node.

3. The virtualized fusion storage sub-system according to claim 1, wherein the simultaneous access of the first server node and the second server node to the common storage pool is carried out by a dual domain storage technology.

4. The virtualized fusion storage sub-system according to claim 1, wherein multiple first server nodes and multiple second server nodes are included in the virtualized fusion storage sub-system.

5. The virtualized fusion storage sub-system according to claim 1, wherein the virtualized fusion storage sub-system is mounted on a server machine.

6. The virtualized fusion storage sub-system according to claim 1, further comprising at least one storage extension module, each controller being connected to the at least one hard disk cluster by way of the at least one storage extension module.

7. The virtualized fusion storage sub-system according to claim 6, wherein the at least one controller of the first server node and the at least one controller of the second server node are respectively connected to a same hard disk cluster by way of the at least one storage extension module.

8. The virtualized fusion storage sub-system according to claim 7, wherein each storage extension module is connected to the at least one controller of the first server node and the at least one controller of the second server node.

9. A virtualized fusion storage system, comprising:
a plurality of virtualized fusion storage sub-systems according to claim 1;
a switch connected to each one of the virtualized fusion storage sub-systems and to a plurality of clients; and
the plural clients for allowing users to access corresponding virtualized fusion storage sub-systems via the plural clients.

* * * * *